June 11, 1940.　　　A. R. OGILVIE　　　2,203,839
MEASUREMENT OF DIELECTRICS
Filed Jan. 28, 1939
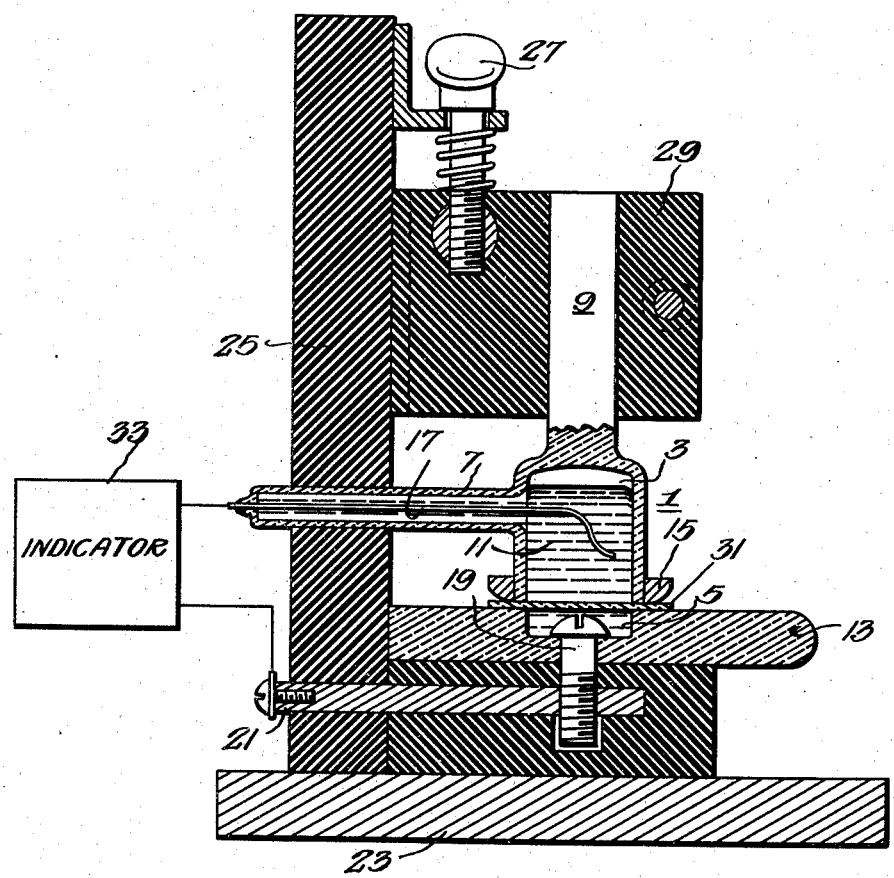
Inventor
Allan R. Ogilvie
By
Attorney Patented June 11, 1940

2,203,839

UNITED STATES PATENT OFFICE 2,203,839

MEASUREMENT OF DIELECTRICS

Allan R. Ogilvie, Oaklyn, N. J., assignor to Radio Corporation of America, a corporation of Delaware Application January 28, 1939, Serial No. 253,275

5 Claims. (Cl. 175—183)

This invention relates to testing devices and more particularly to an improved method of and means for quickly and accurately comparing or determining certain characteristics of samples of a dielectric material such as sheets of mica, or the like; and the objects of this invention are: first, to provide means for accurately indicating the variations in thickness and dielectric constant of a number of sheets of dielectric material; second, to provide a device which will give an accurate indication of the ultimate capacity which will be obtained by evaporating metal on opposite surfaces of a sheet of dielectric material; third, to describe an improved method of testing and grading mica for use as a dielectric in capacitors; fourth, to provide a device which, in testing a dielectric, effectively reproduces a condition which will prevail in the subsequent use of the dielectric.

This invention will be better understood from the following description when considered in connection with the accompanying drawing which represents an embodiment of this invention.

In the manufacture of small fixed capacitors, the natural variations in the thickness, the nature of the surface, and the dielectric constant of the insulating material have made it impossible to accurately predetermine the resultant capacity. This results in a large percentage of rejects, especially when it is necessary to maintain the ultimate capacity within narrow limits.

Small fixed capacitors of high efficiency are usually constructed of alternate layers of mica and copper or lead foil. Due to the fact that mica is a natural mineral product and not a manufactured product, it is impossible to obtain mica sheets of uniform thickness. It is, therefore, necessary to measure and select the mica according to the desired use. While the device to be hereinafter described is particularly adapted to the measurement of mica dielectric, it is evident that it may also be utilized to test or grade similar dielectrics such as paper, or the like.

Manufacturers recently started to make capacitors, which have a relatively large capacitance and small size, by the process of evaporating silver, or a similar metal, on opposite surfaces of thin sheets of mica. It became evident that the thickness and the dielectric constant of the mica employed would have to be absolutely uniform to insure the economical production of the new capacitors. Since the effective dielectric area of the capacitor can be held to very close tolerances by utilizing masks at the time the silver is evaporated on to the surfaces of the mica, it became necessary to provide a system for testing the characteristics of the mica before applying the metal coating in order to control the value of the ultimate capacity.

The mica commercially used in capacitor manufacture is generally less than .004 of an inch thick. Even with the best mechanical gauges the variations in effective thickness due to unevenness might well exceed 20%. In addition to this thickness variation, the dielectric constant may vary as much as 10%. It is evident, therefore, that a selection by mechanical gauges will not be accurate enough to guarantee the proper thickness and in addition does not take into account the changes in dielectric constant.

The difficulty is emphasized in the manufacture of silver coated capacitors since the silver coating is in intimate contact with the mica and penetrates small irregularities in the surface of the mica. Mechanical gauges measure the thickest portion of the mica and do not take into consideration small depressions which may actually increase the capacity considerably.

The first expedient attempted was to make the silver coated mica capacitors of slightly higher capacity than the desired value, and to reduce the capacity to the desired value by removing some of the silver coating by a manual operation. However, there were several disadvantages to this method of manufacture: (1) the cost was increased; (2) the dielectric strength was reduced due to mechanical damage, causing failure at high voltages; (3) the power factor increased; and (4) the adjustment range was limited.

In accordance with this invention, therefore, it is proposed to grade the mica in terms of actual capacity per unit area by a system which takes into consideration not only the thickness and the dielectric constant but also small surface variations of the mica. A device for accomplishing this is shown in the figure of the drawing.

Referring to the drawing, a container 1 is divided into an upper chamber 3 and a lower chamber 5. The container is preferably made of glass and is equipped with an extension arm 7 and a supporting member 9.

The lower chamber 5 is a small cylindrical cup whose upper end is open and lies in a horizontal plane. The upper chamber 3 is a similar cylindrical cup which is closed at the upper end and open at the lower end which lies in a horizontal plane parallel to, and adjacent the plane of the lower cup. The distance between the edges of the upper and lower chambers is approximately .005 of an inch. The container 1 is filled with a fluid conductor 11 such as mercury, or the like.

The lower chamber 5 is supported in a glass worktable 13, the upper surface of the worktable being in the plane passing through the upper edge of the lower chamber 5. For convenience, the lower chamber 5 may be formed by drilling a suitable depression in the worktable. An annular guide plate 15 is positioned around the lower edge of the upper chamber 3. The lower surface of the guide plate 15 extends outwardly and upwardly to guide the dielectric between the upper and lower chambers 3 and 5, respectively.

The surface tension of mercury is sufficiently great that there is substantially no leakage through the aperture between the upper and lower chambers. Even the repeated insertion of mica sheets through this aperture does not cause an appreciable loss of mercury.

The extension arm 7 is provided to allow the mercury in the container to be replenished or removed for cleaning. An electrode 17 enters the upper chamber 3 through the extension arm 7. Electrical contact to the mercury in the lower chamber 5 is provided by a screw 19 which extends into the cup and is connected to a contact rod 21 by means of which electrical contact may be made to an external circuit.

The worktable 13 is securely mounted on a base 23 which supports a vertical supporting member 25. The upper chamber 3 is supported on the vertical supporting member 25 by an adjustable mechanism which includes a thumb screw 27 and a slidable supporting member 29 which engages the supporting member 9. The space between the upper and lower chambers may be suitably adjusted by means of the thumb screw 27.

In using this device to test mica, it will be found that small flakes of mica are sometimes detached from the sheets. The presence of these flakes does not interfere with the operation of this device, however, since they immediately float to the top surface of the mercury. It has been found that after several months of operation the mercury should be removed and cleaned to eliminate the dirt and mica which is collected on the surface of the mercury.

When a mica sheet 31 is inserted between the upper and lower chambers the mercury is divided into the two insulated portions. The mercury is in intimate contact with the two opposite surfaces of the mica sheet 31. The area of contact is limited by the size of container 1. As a result, the capacity between the mercury in the upper and lower chambers is a function of the thickness and the dielectric constant of the mica, and is a measure of the ultimate capacity which may be expected when silver is evaporated on the surface of the mica. It is, therefore, possible to select or grade each mica sheet according to its ultimate capacity. In this manner capacitors of a predetermined value may be manufactured by selecting mica having a predetermined characteristic, or capacitors of approximately known values may be manufactured by grading the mica within any desired limits.

The measurement or indication of the capacity is accomplished by a device 33 which is not in itself a part of this invention and need not be described in detail. This indicator may be a capacity bridge if actual capacity values are desired. On the other hand, it may take the form of a device which automatically indicates relative capacity with respect to any predetermined standard value. The latter system would be used in grading mica for production purposes.

Manufacturing silver coated mica capacitors under the old methods produced a 40% yield of capacitors within the required limits. By grading the mica in accordance with the system set forth in this application, the yield of capacitors within a predetermined limit can be made as high as 90%.

Mica selected in accordance with this invention has also been utilized in the production of capacitors which use lead foil, and a definite improvement has been noted. In fact, variations in the finished capacity of such lead foil capacitors has been found to be less than the original tolerance of the mica. The device described in this application has many uses other than the particular one described. Due to its high speed it is useful in the test of changes in thickness or dielectric constants due to changes in the temperature of the mica, and may also be used to provide a rapid check on the uniformity of dielectric strips, such as rolls of paper, by providing a mechanism for pulling the paper through the device.

I claim as my invention:

1. In a device of the character described, a container having a peripheral slit, a fluid in said container whose surface tension is sufficient to prevent loss of said fluid through said slit, said slit being adapted to receive a sheet of dielectric material which completely separates said fluid into two portions, each portion being in intimate contact with one surface of said dielectric, and means for making an electrical connection to each of said portions whereby the capacity between said two portions may be indicated.

2. In a device of the character described, a container which is divided into two spaced portions which terminate in adjacent parallel planes, a fluid in said container having a surface tension sufficient to prevent it from passing through the space between said portions, said space being adapted to receive a thin sheet of dielectric whose characteristics are to be tested, and means for maintaining said fluid in intimate contact against both sides of said dielectric within the limits of said container.

3. In a device of the character described, a container which is divided into spaced upper and lower portions which respectively terminate in open ends which lie in closely adjacent horizontal parallel planes, an electrically conducting fluid in said container whose surface tension is sufficient to prevent said fluid from passing through the space between said portions, said space being adapted to receive a thin sheet of dielectric whose characteristics are to be tested, said dielectric completely dividing said fluid into two insulated portions, and means for maintaining said fluid in intimate contact with opposite sides of said dielectric throughout the area defined by said container.

4. In a device for testing the characteristics of a dielectric, a container which is divided into closely spaced upper and lower chambers, the adjacent ends of which are open and terminate in parallel planes and the outer ends of which are closed, an electrically conducting fluid in said container whose surface tension is sufficient to prevent said fluid from passing through the space between said upper and lower chambers, a worktable whose upper surface lies in the plane of the open end of said lower chamber, and an annular guide plate surrounding the open end of said upper chamber adapted to guide a sheet of dielectric which is to be tested between the open ends of said upper and lower portions, thereby separating said fluid into two insulated portions.

5. A device of the character described in claim 4 in which the spacing between said upper and lower chambers is approximately five thousandths of an inch.

ALLAN R. OGILVIE.